July 31, 1945.  J. F. PETERS  2,380,462
CAN BODY NECKING-IN MACHINE
Filed May 21, 1942  9 Sheets-Sheet 1

INVENTOR.
John F. Peters
BY Ivan D. Thornburgh
Charles H. Erne
ATTORNEYS

July 31, 1945. J. F. PETERS 2,380,462
CAN BODY NECKING-IN MACHINE
Filed May 21, 1942 9 Sheets-Sheet 4

INVENTOR.
John F. Peters
BY Ivan D. Thornburgh
Charles H. Erne
ATTORNEYS

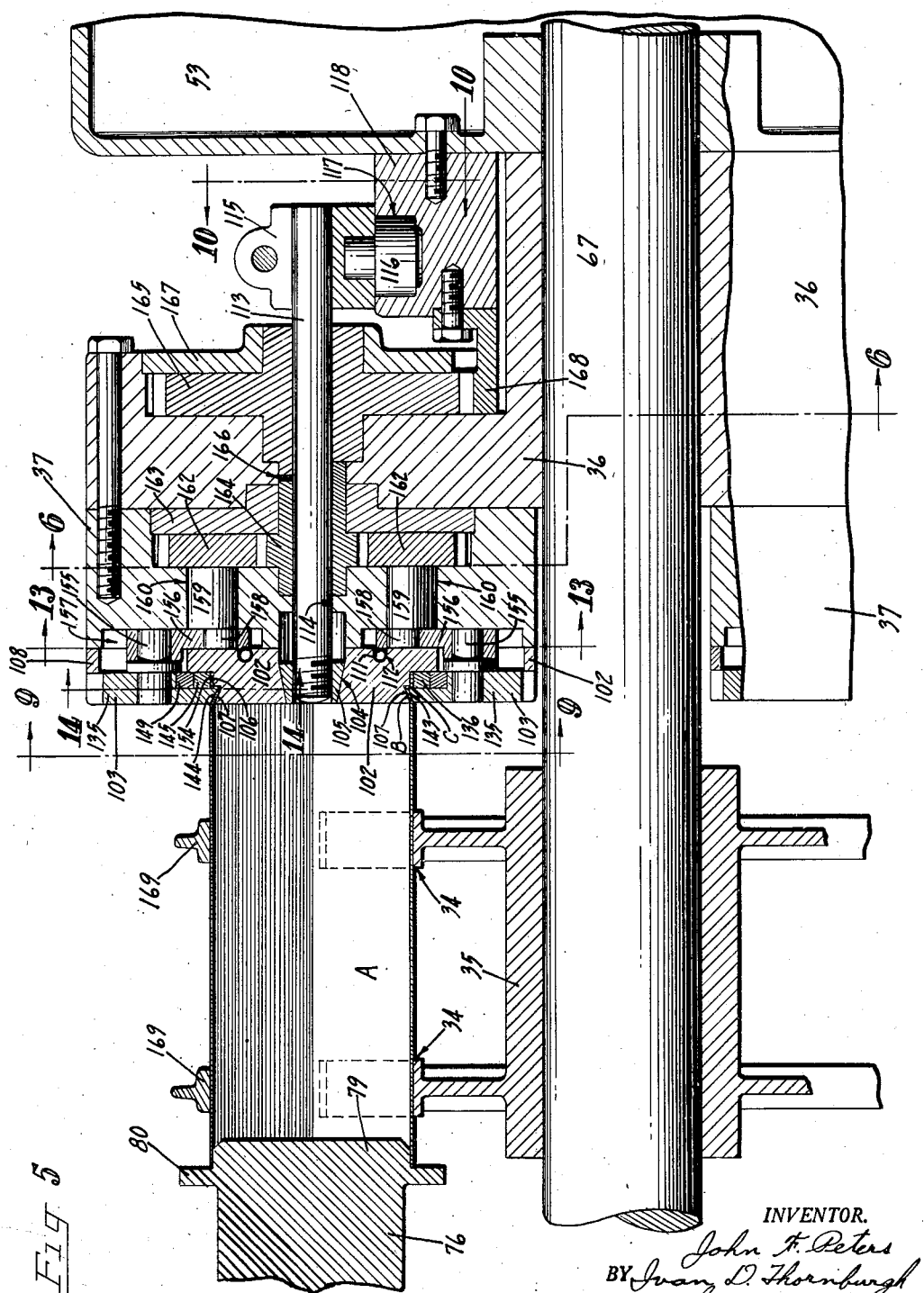

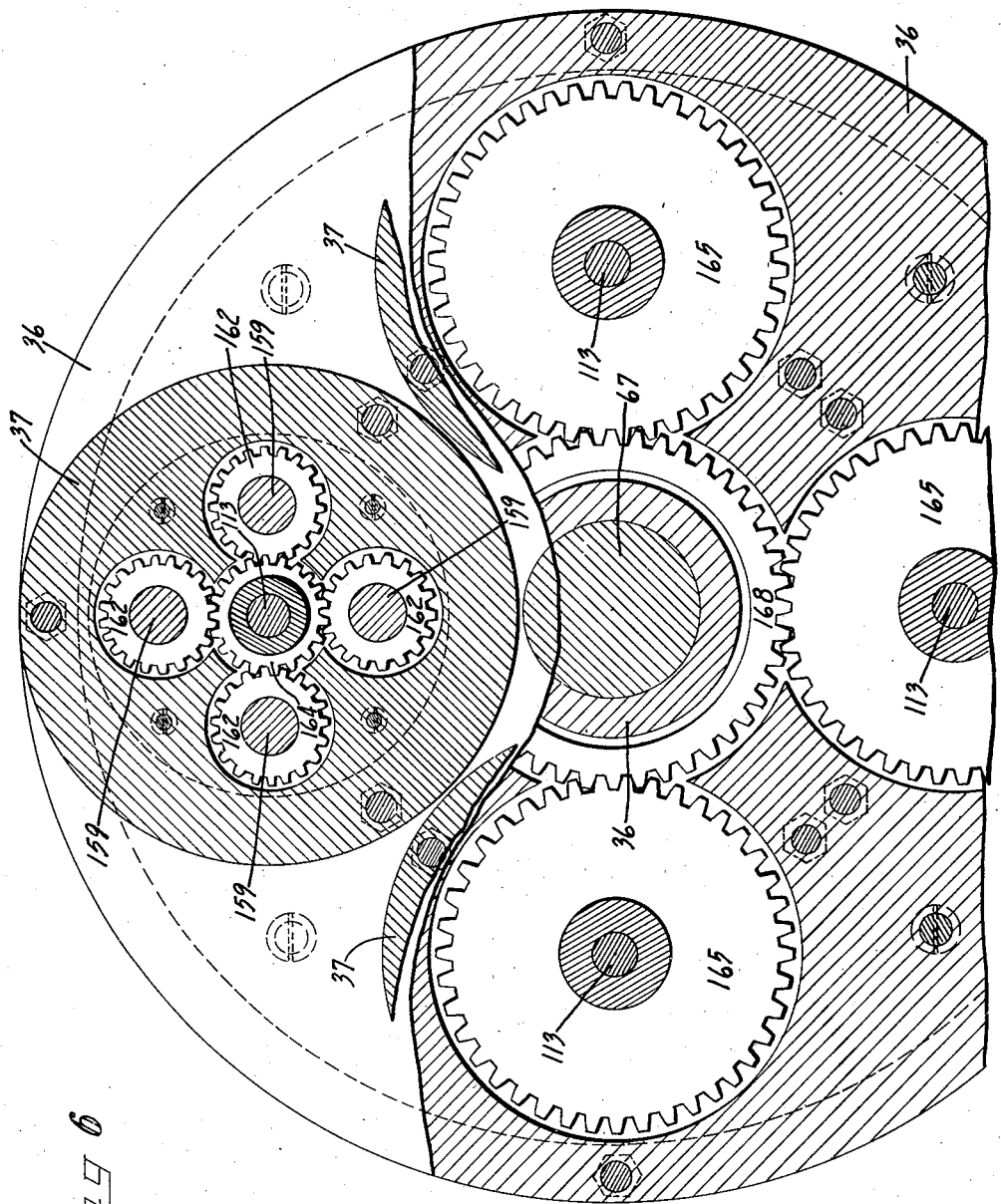

July 31, 1945.  J. F. PETERS  2,380,462
CAN BODY NECKING-IN MACHINE
Filed May 21, 1942  9 Sheets-Sheet 7
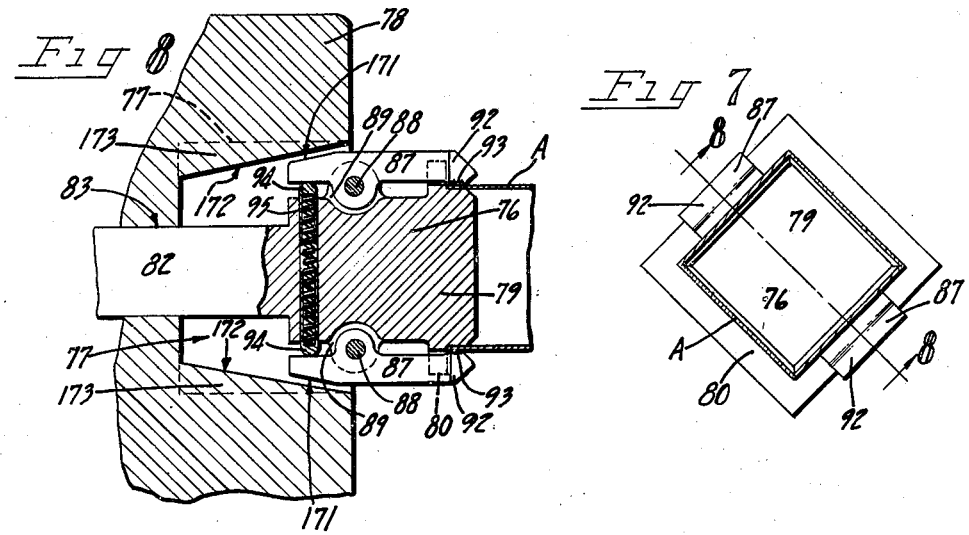
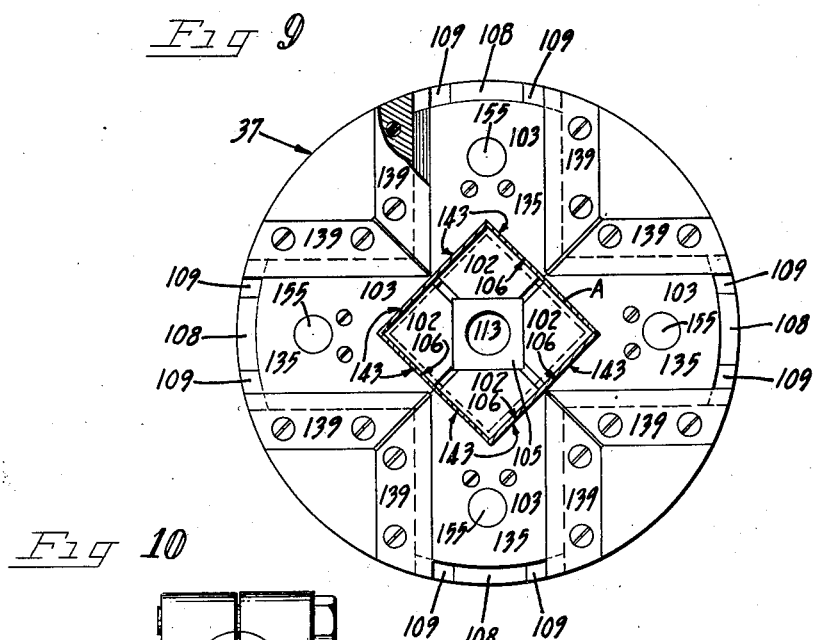
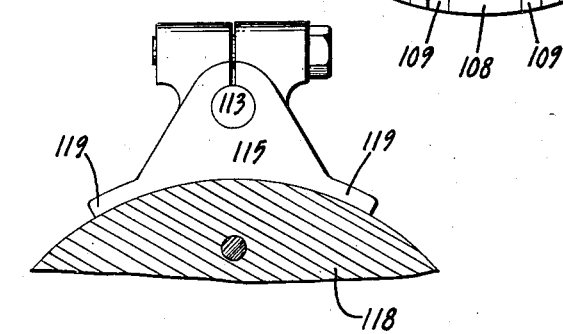
INVENTOR.
John F. Peters
BY
ATTORNEYS July 31, 1945.  J. F. PETERS  2,380,462
CAN BODY NECKING-IN MACHINE
Filed May 21, 1942  9 Sheets-Sheet 8
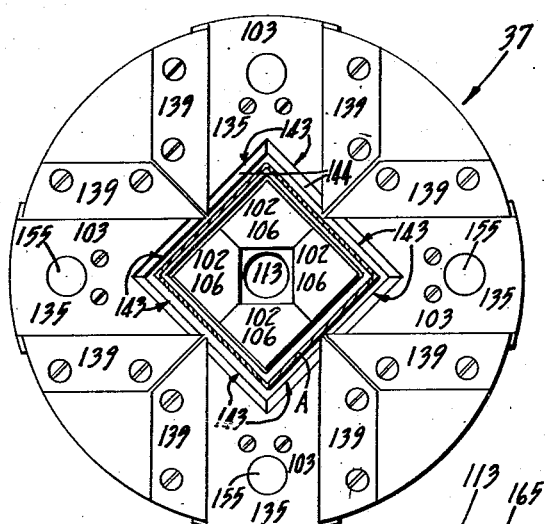
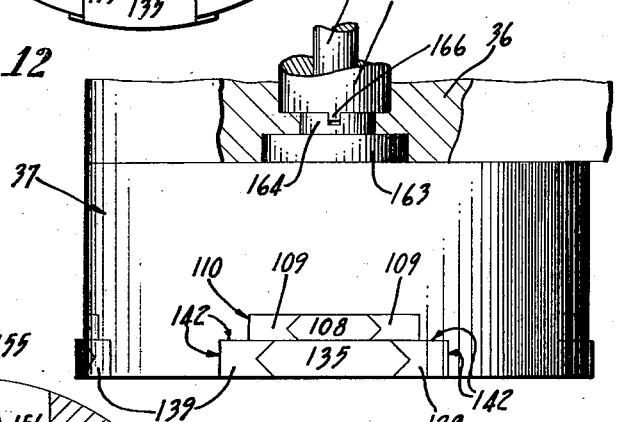
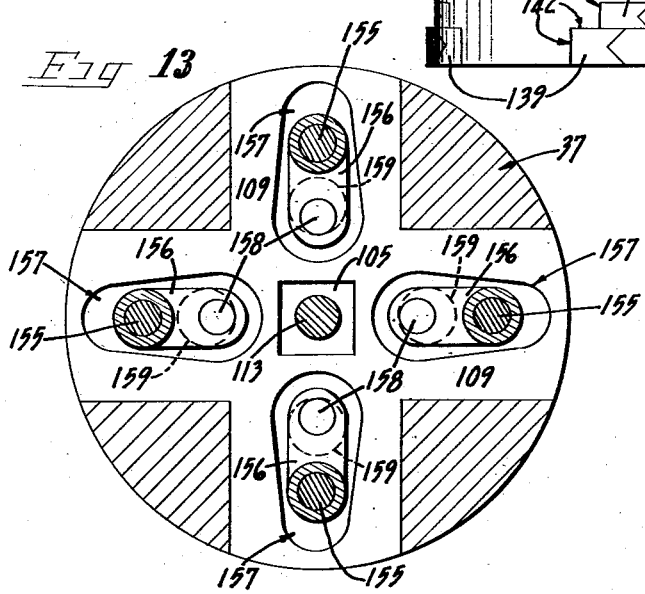
INVENTOR.
John F. Peters
BY Ivan D. Thornburgh
Charles H. Erne
ATTORNEYS July 31, 1945.  J. F. PETERS  2,380,462
CAN BODY NECKING-IN MACHINE
Filed May 21, 1942  9 Sheets-Sheet 9
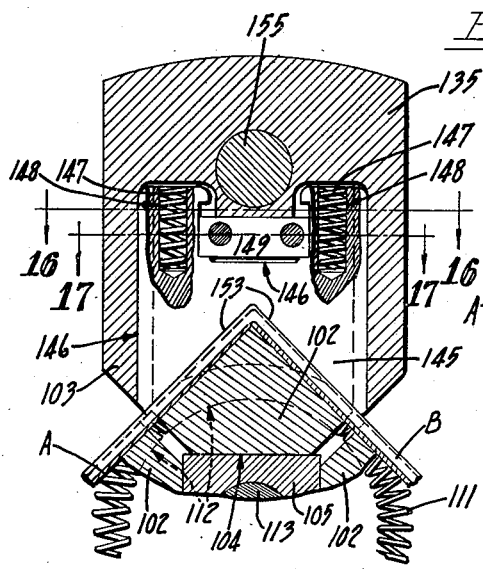
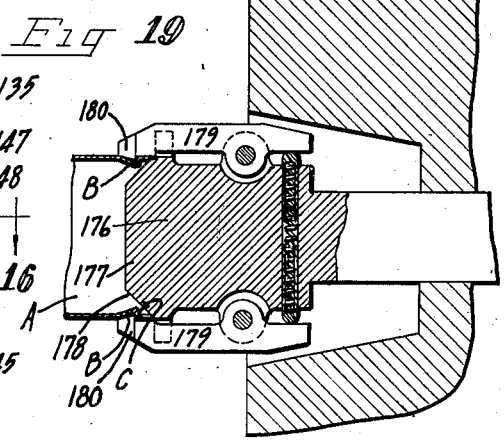
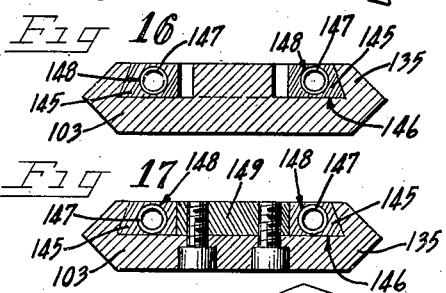
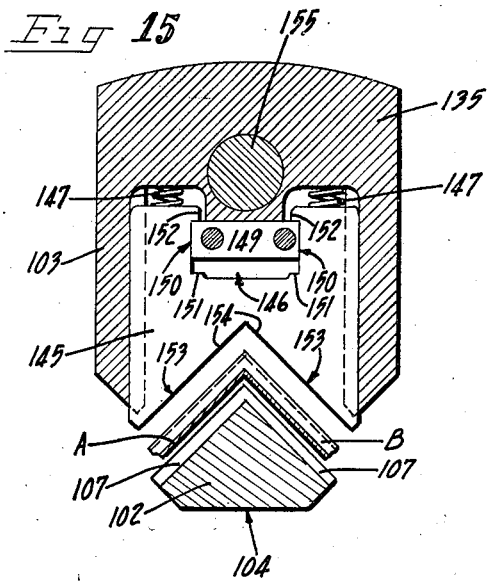
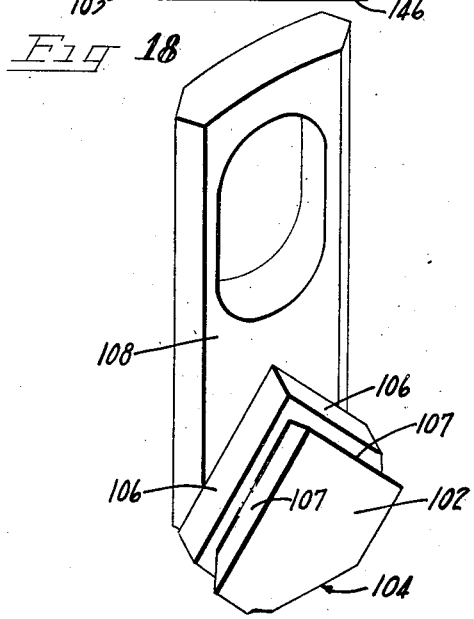
INVENTOR.
John F. Peters
BY Ivan D. Thornburgh
Charles H. Erne
ATTORNEYS Patented July 31, 1945

2,380,462

UNITED STATES PATENT OFFICE 2,380,462

CAN BODY NECKING-IN MACHINE

John F. Peters, Leonia, N. J., assignor to American Can Company, New York, N. Y., a corporation of New Jersey Application May 21, 1942, Serial No. 444,000

2 Claims. (Cl. 93—36)

This invention relates to a machine for preparing tubular fibre can or container bodies for the reception of can end members and has particular reference to a machine for necking-in or beading such can bodies adjacent their ends preparatory to assembling the can end members therewith.

The machine disclosed in the accompanying drawings and described herein is adapted for use in the manufacture of fibre milk containers of the character disclosed in United States Patent 2,085,979, issued July 6, 1937, to John M. Hothersall, on Container.

In the treatment of light weight fibre can bodies it sometimes is desirable during their manufacture to move the body into and out of work performing devices located along a path of travel through which such bodies move. The light weight of the bodies in some instances creates difficulties in properly moving and locating them relative to the work performing devices particularly at high speed and this sometimes deforms the bodies so that the can end members will not fit properly upon their being assembled with the bodies.

The present invention contemplates overcoming this difficulty by providing a plurality of revolving necking-in devices which are arranged to operate on opposite ends of can bodies as the latter are being advanced continuously at high speed through the machine.

An object of the invention is the provision of a machine for necking-in fibre can bodies wherein the bodies advance continuously along a path of travel adjacent work performing devices which neck-in or reshape the end portions of the bodies to form a seat therein for a can end.

Another object is the provision in such a machine of work performing devices which clamp an end portion of an inserted can body prior to the necking-in operation and hold it with a slip grip during the necking-in operation to facilitate shaping of a can end seat.

Another object is the provision of a machine of this character wherein the work performing devices revolve through an arcuate path of travel and are accompanied by laterally movable gripper fingers for shifting the can bodies into and out of the work performing devices for the necking-in operation while the bodies are continuously advanced through the machine.

Numerous other objects and advantages of the invention will be apparent as it is better understood from the following description, which, taken in connection with the accompanying drawings, discloses a preferred embodiment thereof.

Referring to the drawings.

Figure 2:
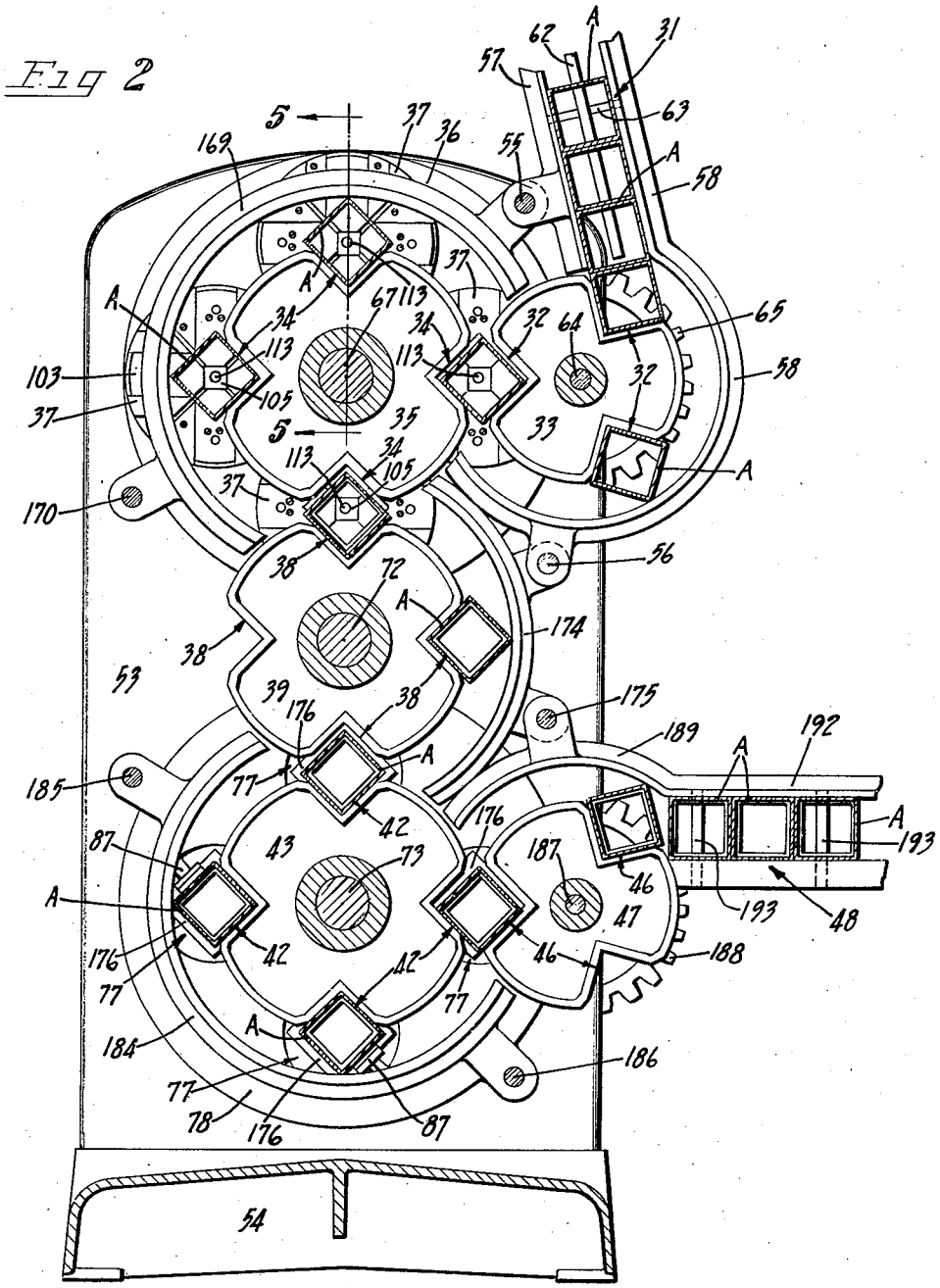
Fig. 2 is a vertical section through the machine taken substantially along the line 2—2 in Fig. 1 with parts broken away, the view also showing can bodies in place in the machine and shown in section.
Figure 4:
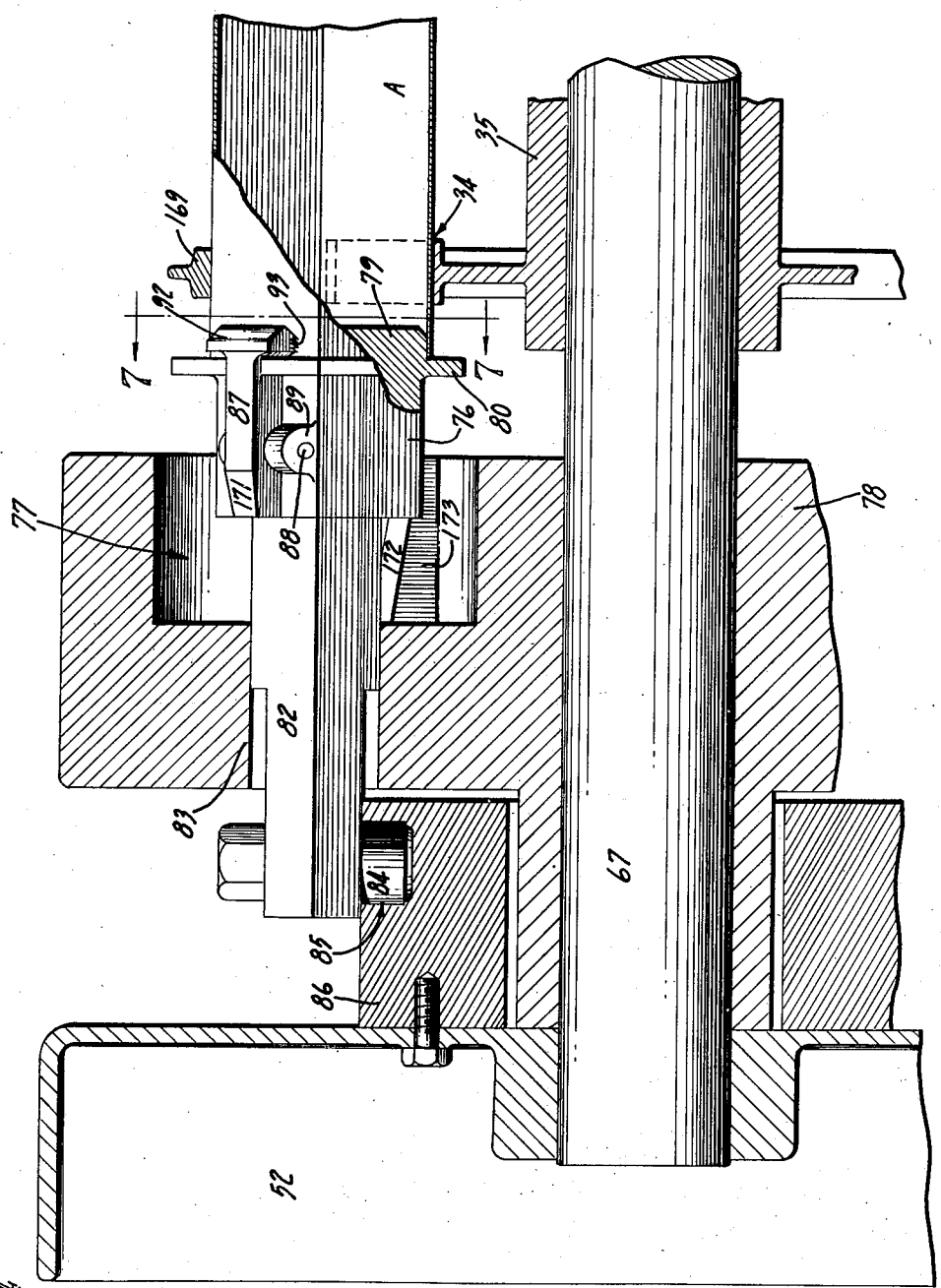

Figs. 4 and 5 when taken together illustrate a transverse section on an enlarged scale as viewed substantially along the line 5—5 in Fig. 2 with parts overlapping, parts being broken away and showing mechanism at an initial necking-in station where the reshaping at one end of a body is performed;

Fig. 6 is an enlarged sectional view taken substantially along the broken line 6—6 in Fig. 5 with parts broken away;

Fig. 7 is a sectional view taken substantially along the line 7—7 in Fig. 4 and drawn to the same enlarged scale;

Fig. 8 is a sectional detail viewed substantially along the line 8—8 in Fig. 7 drawn to the same scale and showing the initial gripping fingers engaging an end of a can body shown in section;

Fig. 9 is a view taken substantially along the line 9—9 in Fig. 5, and showing a front view of a necking-in head, with parts broken away and parts in section, and with a can body shown in section;

Fig. 10 is a view taken substantially along the line 10—10 in Fig. 5, with parts broken away and parts in section;

Fig. 11 is a view similar to Fig. 9 showing the necking-in head parts in a different position;

Fig. 12 is a side view of the necking-in head shown in Figs. 9 and 11 with a fragment of a necking-in head disc, the latter being broken away and shown in section;

Fig. 13 is a sectional view through the necking-in head taken substantially along the line 13—13 in Fig. 5, with parts in section;

Fig. 14 is an enlarged sectional detail taken substantially along the line 14—14 in Fig. 5, with parts broken away and showing the necking-in head squeezer jaws in an operative position;

Fig. 15 is a view similar to Fig. 14 and showing the necking-in head parts in an inoperative position;

Figs. 16 and 17 are sectional views taken substantially along the lines 16—16, 17—17 in Fig. 14;

Fig. 18 is an enlarged perspective view showing the details of an inner squeezer jaw; and Fig. 19 is a view similar to Fig. 8 showing another form of gripping finger which is used for engaging necked-in bodies.

The machine embodying the present invention is adapted to receive open ended tubular articles, such as fibre can bodies A (Figs. 2 and 5) which are illustrated as being of square cross-section. These can bodies are placed in stack formation within a magazine 31 (Fig. 2). The lowermost body in this magazine drops into a double pocket 32 of a rotating intake transfer double turret 33 located at the feed end of the machine. The can bodies thereafter are advanced through the machine by a series of carriers or continuously rotating turrets which are operated with and along the path of work performing devices as will be described at this time.

Individual can bodies are advanced by the intake turret 33 and are transferred into a double pocket 34 of a carrier or necking-in double turret 35 located in the upper part of the machine (Figs. 2 and 5). This necking-in turret is rotatable in unison with an adjacent necking-in head disc 36 at an initial work performing or necking-in station. A plurality of necking-in heads 37 are bolted to the disc and are revolved in axial alignment with the turret pockets 34 so that the can bodies may be shifted transversely of the machine into the necking-in heads 37 for necking-in one end of the shifted bodies.

Figure 1:
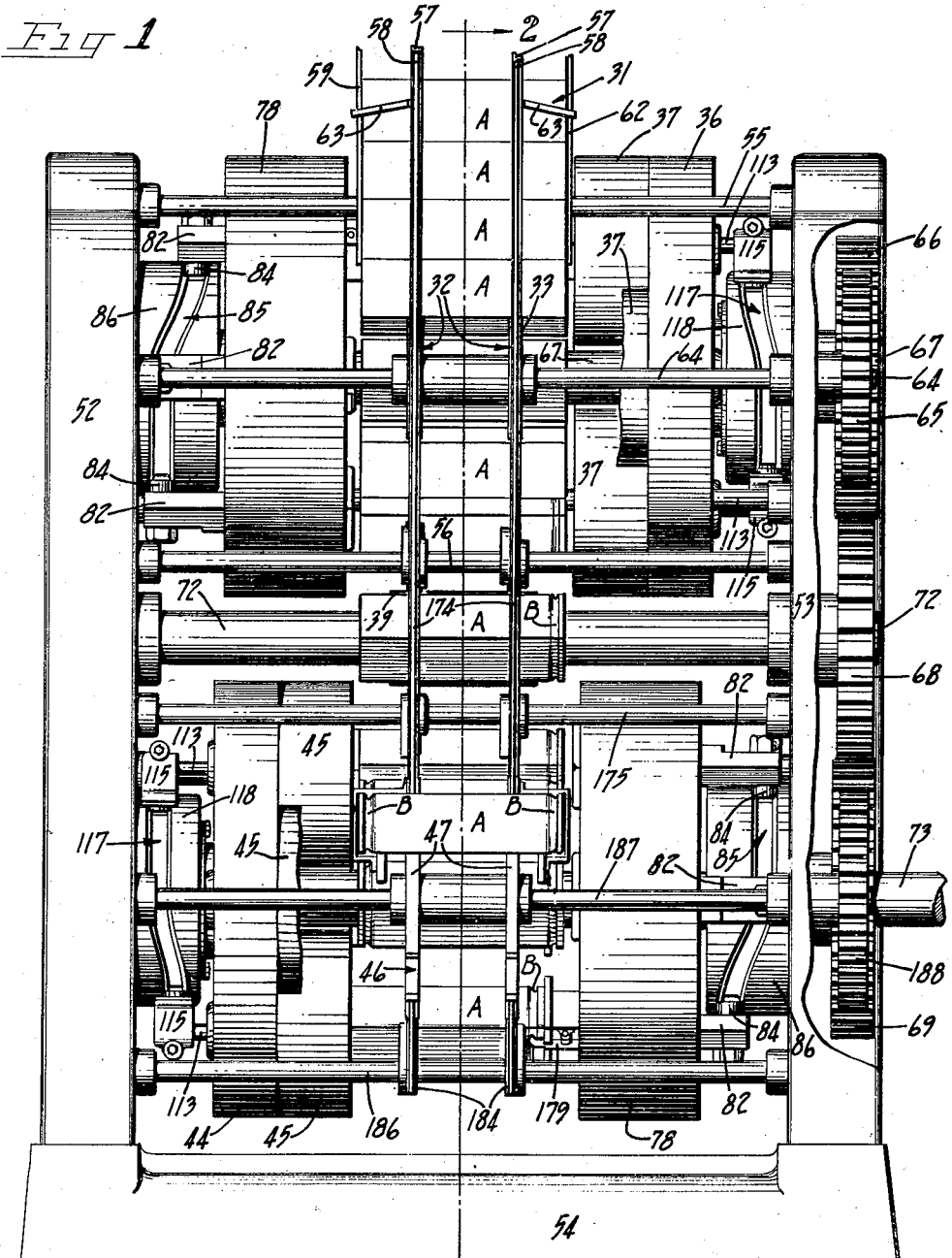
Figure 1 is a front elevation of the machine embodying the instant invention with parts broken away and showing can bodies in place in the machine.

The can bodies upon being necked-in at one end are withdrawn from the necking-in heads and are deposited into a double pocket 38 in a transfer double turret 39. This turret carries the can bodies downwardly through an arcuate path of travel and places them into a pocket 42 in a second carrier or necking-in turret 43 (Figs. 1 and 2). This turret like turret 35 is operated simultaneously with a lower necking-in head disc 44 which is similar to the disc 36. In like manner the disc 44 carries a plurality of necking-in heads 45 which are similar to necking-in heads 37.

The can bodies upon being placed into the pocket 42 in the necking-in turret 43 again are shifted, this time in the opposite direction for insertion into the necking-in heads 45 so that the straight end of the bodies may be reshaped. Following this necking-in operation the can bodies are withdrawn from the necking-in heads to a centrally disposed position in the turret pocket 42 so that the necked-in bodies may be transferred to a double pocket 46 in a discharge double turret 47. This turret carries the completely necked-in can bodies upwardly and outwardly along a curved path of travel and discharges them into a chute 48 which leads to any suitable place of deposit for the bodies.

Figure 3:
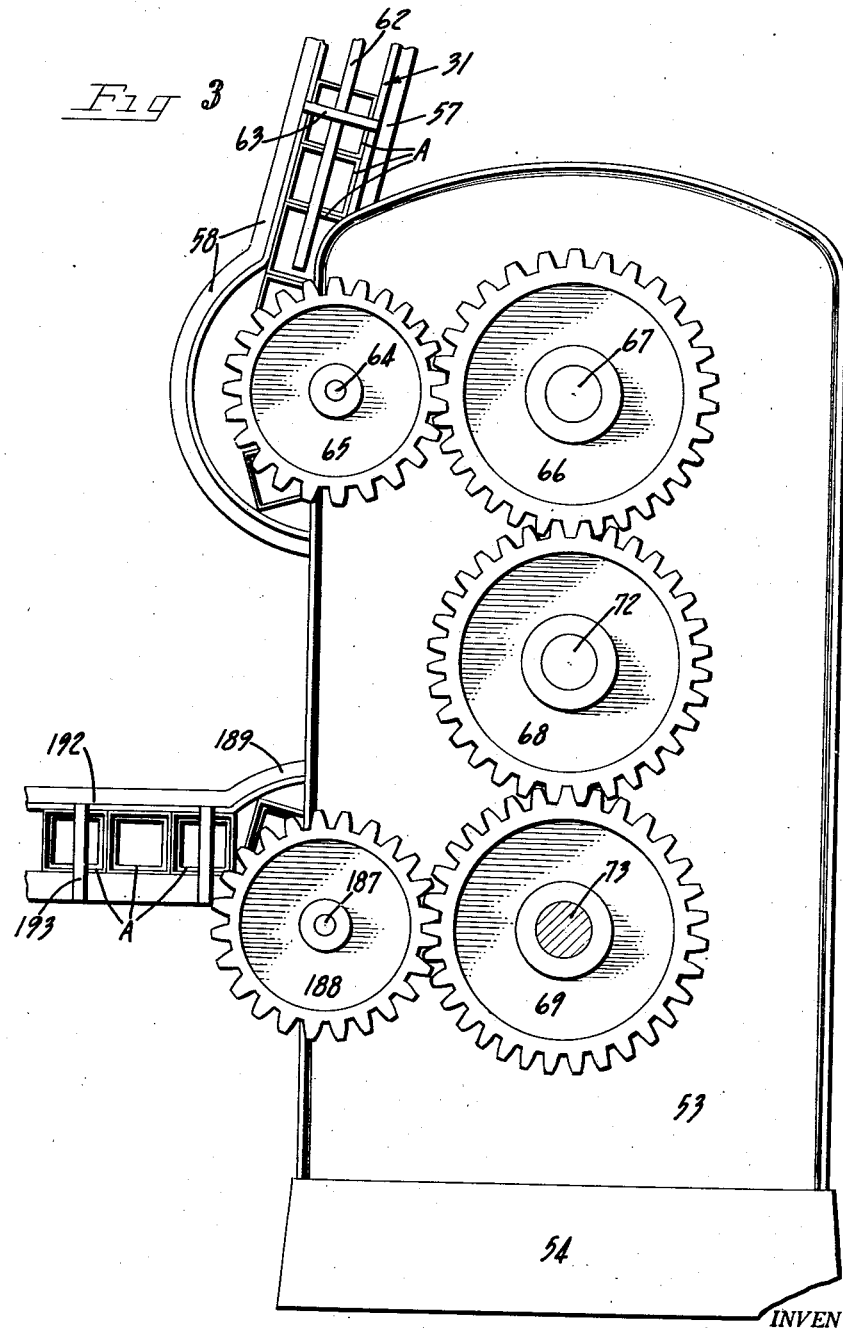
Fig. 3 is a side elevation of one end of the machine the view being taken from the right as viewed in Fig. 1 with parts being broken away.

Referring now to the machine in detail, reference first should be had to Figs. 1, 2 and 3 which illustrate the machine in general. These figures show that the working parts of the machine are supported on a pair of vertical side frames 52, 53 which constitute the main frame of the machine and which are secured to a base 54. The magazine 31 is mounted centrally between these frames on cross rods 55, 56 the ends of which are carried in each of the frames. The magazine comprises angularly disposed guides 57, 58 and narrow end rails 59, 62 which are held together by side rails 63. The lower end of the guides 58 are curved and extend concentrically around the intake turret 33 and thus hold the can bodies in place in their pockets 32 of the turret.

The intake turret 33 is mounted on a transverse shaft 64 journaled in bearings formed in the frames 52, 53. A gear 65 secured on one end of this shaft is driven by a gear 66 secured to the end of a shaft 67 (Fig. 3). The gear 66 is driven by gears 68, 69 mounted on and secured to respective shafts 72, 73, the latter being the main drive shaft of the machine and thus may be driven from any suitable source.

The necking-in turret 35 is secured to the shaft 67 and is disposed centrally of the machine at the initial necking-in station. The necking-in head disc 36 carrying the necking-in heads 37 also is secured to this shaft, to the right of the turret 35 as viewed in Figs. 1 and 5.

A can body A received from the intake turret 33 and resting in one of the double pockets 34 of the turret 35 is in such a position that one end of the body is in alignment and is adjacent to one of the necking-in heads 37. Shifting of the can body laterally of its turret pocket and into necking-in position within its associated head at the initial necking-in station, is effected by an aligned pusher head 76. There are four of these pusher heads 76, located one each in alignment with each of the necking-in heads 37. Each of the pusher heads 76 is disposed within a recess 77 formed in a pusher head holder 78 mounted on the shaft 67 (toward the left as in Figs. 1 and 4).

Each of the pusher heads 76 has an inner aligning chuck 79 formed thereon which is adapted to enter the open end of a can body A resting in its aligned double pocket 34 of the turret 35. A pusher head wall 80 also is formed on each pusher head and this wall is square in shape and larger than the cross sectional area of the can body with which it engages.

Each pusher head 76 is formed with a square stem 82 which slides in a bearing 83 in the pusher head holder 78. The square cross section of the stem holds the pusher head thereon in alignment with the can body A. A cam roller 84 carried on the end of each stem 82 operates in a cam groove 85 of a stationary cam 86 which is secured to the side frame 52. The pusher heads 76 thus are reciprocated in the head holder 78 through an inward or pusher stroke and thence outwardly through a withdrawing stroke while the holder is rotated simultaneously with the turret 35 and with the necking-in head disc 36 on the shaft 67.

In order to hold a can body A on a chuck 79, two gripper fingers 87 are provided and carried by each pusher head 76 (Figs. 4, 7 and 8). These fingers grip the exterior walls of the can body from opposite sides and hold it securely against the chuck. Such fingers are carried on pivot pins 88 mounted in lugs 89 formed on opposing sides of the pusher heads. The grip end of each finger has an enlarged portion as at 92 which has its inner face serrated in gripper teeth 93. The other end of each gripper finger is engaged by a spring barrel 94 (see Fig. 8) carried in a bore that extends transversely of the head. The bore contains a spring 95 the ends of which fit into the two barrels and press them outwardly against the fingers 87. This forces the gripper teeth 93 against the outside of a can body when aligned on the chuck 79.

When a pusher head 76 moves through a pusher stroke, the can body A is shifted to the right as viewed in Fig. 4, into a necking-in head 37 (Fig. 5). This is done as an incident to the reshaping of one end of the body along an inclined section B adjoining a shoulder C as hereinbefore explained. Such reshaping preferably is done by a plurality of inner and outer squeezer or necking-in jaws 102, 103 which are carried in each head 37 and which are movable toward each other in the usual manner for effecting the reshaping of the can bodies.

The inner squeezer jaws 102 preferably are square in contour with an inner corner cut off and forming a flat tapered actuating surface 104 (Figs. 9, 11, 15 and 18). There are four of these jaws in each head and they are grouped around a centrally located tapered expanding plug 105 in a square formation. This adapts the jaws for insertion within the end of the square can body and locates one outer corner of each jaw adjacent a corresponding corner of the can body. The outer edges of each jaw 102 are formed with straight shoulders or holding faces 106 and adjacent inwardly inclined or tapered forming faces 107 (see also Fig. 5).

The jaws 102 are formed on the inner ends of slide members 108 which slide in gibs 109 (Fig. 12) secured in wide radial grooves 110 in the necking-in head 37. A circular coiled spring 111 (Figs. 5 and 14) disposed within arcuate grooves 112 formed in the back of the slide members hold the grouped jaws in engagement with the expanding plug 105.

The expanding plug 105 is mounted on the inner end of an actuating rod 113 which is carried in a bearing 114 formed in the necking-in head 37. The rod extends through the middle of the head and through the disc 36 on which the head is bolted. The outer end of the rod carries a shoe 115 (see also Fig. 10) which supports a cam roller 116. The cam roller operates in a cam groove 117, formed in a stationary barrel cam 118 which surrounds the hub of the disc 36 and which is bolted to the adjacent side frame 53. The shoe 115 is formed with side wings 119 which engage the periphery of the cam and thus hold the expanding plug rod 113 against turning.

Hence as the shaft 67 rotates the head disc 36 and the turret 35 and thus carries each head 37 and the inserted can body A through a circular path of travel, the cam roller 116 traverses the cam groove 117 in the cam 118. During this travel, the cam groove 117 and the cam roller 116 shift the rod 113 inwardly, as viewed in Fig. 5, and thus force the tapered expanding plug 105 inwardly along the tapered surfaces 104 of the jaws 102.

This action forces the jaws outwardly and thus brings the holding and the forming faces 106, 107 into engagement with the inside wall surfaces of the can body. These jaw faces merely touch the can body surfaces and do not expand the body. Simultaneously with this shifting of the inner jaws 102, the outer jaws 103 move in and cooperate with the inner jaws to effect the reshaping of the can body, as will now be described.

There are four outer squeezer jaws 103 in each head, one for each inner jaw 102. The outer jaws are formed as a part of and are disposed on the inner ends of slide members 135. These slide in gibs 139 (Figs. 9, 11 and 12), disposed in stepped recesses 142 located adjacent to and in front of the grooves 110 in the necking-in heads 37. The outer jaw slide members 135 are therefore located adjacent to and in front of the inner jaw slide members 108.

Each outer squeezer jaw 103 is formed with a V-notch 143 which corresponds to a corner of a can body. Each notch defines inwardly tapered forming faces 144 which align with and which correspond to the tapered forming faces 107 on the inner jaws 102, as best shown in Fig. 5.

Each of the outer jaw slide members 135 carries a yieldable holding jaw 145 which is disposed in a dovetail recess 146 (Figs. 5, 14, 15, 16, 17) formed in the backs of the jaw slide members. Adjacent its outer end, each holding jaw 145 is backed up by a pair of compression springs 147 which are interposed between the outer end of the jaw and slide member adjacent the end of its recess 146. The springs are retained in sockets 148 formed in the holding jaw. It is these springs that provide the yieldable elements of the jaws.

Each holding jaw 145 is retained in its slide recess 146 against the resistance of the springs 147 by a key 149 which is secured to the slide member within the recess 146. The ends of the key project into grooves 150 formed in the holding jaw. The ends of these grooves set off a pair of stop shoulders 151, 152 which are engageable by the key and which limit the travel of the jaw within its recess 146.

The inner ends of the holding jaws 145 normally project inwardly of the inner ends of the outer squeezer jaws 103 and are formed with V-shaped notches 153 which define straight holding faces 154 that correspond with the holding faces 106 on the inner jaws 102.

Hence while a can body is in a head 37 and while the inner jaws 102 are moving outwardly to engage the inside surfaces of the body, the outer jaws 103 are moving inwardly to engage the outside surfaces of the body. During this movement of the outer jaws, the yieldable holding jaws 145 engage the body first and clamp the marginal edges of the body against the holding surfaces 106 of the inner jaws 102 in a so-called slip grip. This slip grip action is desirable to compensate for the reduction in length in the necking-in of the body and thus allows slippage at the marginal work edge since the opposite end of the can body is held firmly by the gripper fingers 87.

As the outer jaws 103 continue to move in against the can body, the tapered forming faces 144 press the body wall into place against the tapered forming faces 107 of the inner jaws 102. It is this action that reshapes or necks in the can body to form the inclined section B and the adjoining shoulder C (Fig. 5), as hereinbefore explained.

Shifting of the outer squeezer jaws 103 through an inward or forming stroke and then outwardly through a return stroke is effected by pivot pins 155 carried in each of the jaw slide members 135. These pins extend back through elongated openings formed in the inner jaw slide member 108 (see Fig. 18) and terminate in suitable bearings formed in the outer ends of eccentric crank arms 156. There are four of these crank arms, one for each outer slide member 135 and they are disposed in recesses 157 formed in the heads 37. The inner ends of the crank arms are mounted on eccentric pins 158 formed on the inner ends of short shafts 159 journaled in bearings 160 in the heads 37.

There are four of these shafts 159 grouped around each expanding plug actuating rod 113 (see Fig. 6). The outer end of each shaft carries a gear 162 and these gears are held against lateral displacement by a plate 163 which is bolted to the back of each of the heads 37. The gears 162 are grouped around and mesh with a head gear 164 which surrounds each plug actuating rod 113. Each head gear is formed with hubs which are journaled in the necking-in head 37 and in the plate 163.

The head gear 164 is driven from a driving gear 165 (see Fig. 6) by a slot and tongue connection 166 which includes a plurality of slots and tongues formed in the adjacent ends of the hubs of the head gear and the driving gear (see Figs. 5 and 12). There are four of these driving gears (Fig. 6) one for each head 37, and they are held in place by an annular plate 167 which is bolted to the back of the disc.

These driving gears are formed with hubs which are journaled in suitable bearings formed in the disc and in the plate. The gears mesh with and are driven by a stationary ring gear 168 which surrounds the hub of the disc 36 and which is bolted to the cam 118 on the frame 53. Thus as the shaft 67 rotates the disc 36, the driving gears 165 revolve about the ring gear 168. Hence through the tongue and slot connections 166, each gear 165 rotates the connecting head gear 164 and its meshing gears 162. It is this turning of the gears 162 that rotates the eccentric pins 158 and through them actuate the eccentric arms 156 and the outer jaw slide members 135 pivotally connected thereto. This action is timed with the action of the cam actuated inner squeezer jaws 102 and thus brings about the proper cooperation to neck in the can bodies at one end (Fig. 5).

It should be understood that the shifting and necking-in of the can bodies is carried out at this initial necking-in station while they are carried around a circular path of travel in the double pockets 34 of the rotating double turret 35, as hereinbefore described. The bodies are retained in these pockets by curved double guides 169 which extend concentrically around the turret 35. These guides like guides 58 are mounted centrally between the frames on the cross rod 55 and on an auxiliary cross rod 170. The ends of the auxiliary cross rod are carried in each of the side frames 52, 53.

The action of each necking-in head 37 is continuous, i. e., one revolution of the disc 36 carries the necking-in head through one complete cycle. Can bodies A now are ready to be withdrawn from the necking-in head for transfer into the pocket 38 of turret 39.

In order to withdraw a can body from the necking-in head 37 the corresponding pusher head 76 (Figs. 4, 5 and 8) is shifted by the actuating cam 86 to the left as viewed in Fig. 4. After this withdrawing action and when the can body reaches a centralized position in its turret 35, the gripper fingers 87 release the body so that it will be in position for further advancement. This release is brought about by cam action. For this purpose the outer ends of the fingers 87 are beveled thereby providing a tapered cam surface 171 for each finger which engages against an inclined surface 172 formed on a web section 173 located in the pusher head recess 77 of the head holder 78.

There are two web sections for each recess corresponding to the two fingers. Engagement of the beveled fingers with the cam sections as a pusher head recedes, presses the rear ends of the fingers inwardly against the spring barrels 94, and thus compresses the spring 95. It is this action that releases the gripper fingers 87 from engagement with the can body as it reaches the central position in the turret. The pusher head 76 continues movement to the left after the body is centralized until the chuck 79 is clear of the can body (Fig. 1).

The centralized and released can body A has now reached the bottom of the turret 35 (Fig. 2) where it enters one of the double pockets 38 of the transfer turret 39 whereupon it is moved downwardly through a curved path of travel. The can body A is held in place in the double turret pocket 38 by a pair of curved guides 174. These guides like guides 58, 169 also are mounted centrally between the frames on the cross rod 56 and on an auxiliary cross rod 175. The ends of the cross rod 175 are carried in the frames 52, 53.

From the transfer turret 39, the can body is picked up by the double pocket 42 in the second necking-in turret 43. The can body deposited in the turret pocket 42 is in alignment with one of the necking-in heads 45 (Fig. 1). These necking-in heads 45 are located on the opposite side of the machine in respect to the heads 37 but are otherwise identical in form and are operated in the same manner. It is thought that a description of the heads 45 may be omitted to avoid repetition.

It will be recalled that at the initial necking-in station after the necking-in operation, one end of the can body remained straight and unaltered. Hence the chuck 79 and the gripper fingers 87 (Fig. 8) used at this station are designed to hold onto a straight end can body. At the second necking-in station now to be considered, one end of the body is already necked-in and hence this end will be engaged in shifting the body. For this purpose pusher heads 176 (Fig. 19) are provided. In general, these are of the same construction as the pusher heads 76 hereinbefore mentioned.

Each pusher head 176 has a chuck 177 which is formed with beveled edges 178, which provide clearance for the necked-in end B of the can body. Modified gripper fingers 179 are carried by the head 176 and each finger has a hooked shaped outer end 180 which engages in the inclined necked-in section B and extends over the shoulder section C. This grips the body during the time its opposite end is moving into the necking-in head 45.

This shifting is followed by the reshaping and withdrawing operations in the head 45. The double turret 43 during these operations advances the can body in a counter-clockwise direction (Fig. 2) along a curved path of travel. Curved double guides 184 hold the can body in place within the double pocket 42 at such a time. These guides also are mounted centrally of the machine on rods 185, 186 carried in the frames 52, 53.

Continuous rotation of the turret 43 carries the completely necked-in can bodies A into a position adjacent the double discharge turret 47 (Fig. 2) and deposits the bodies into the pockets 46 of the discharge turret. Turret 47 is mounted on and is rotated with a transverse shaft 187, which is journaled in bearings formed in the frames 52, 53. A gear 188 secured at one end of shaft 187 meshes with and is driven from the gear 69 mounted on the main drive shaft of the machine (Fig. 3).

Can bodies deposited in the pockets 46 of the discharge turret 47 are carried clockwise (Fig. 2) along a curved path of travel and are discharged into the chute 48. Curved double guide rails 189 concentric with the turret 47 retain the can bodies in the discharge pockets 46 until they are advanced into the chute 48. This chute will direct the can bodies to any suitable place of deposit.

Extension 192 of the guide rails 189 project out over the chute 48 and thus confine the can bodies in the chute. The guides 189 also are mounted centrally of the machine. At one end the guides are mounted on the rod 175 which is carried in the frames 52, 53. The extensions 192 may be supported in any suitable manner as by vertical bars 193.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for necking-in the body walls of tubular fibre containers, the combination of a plurality of contiguous rotatable turrets each having peripheral pockets for receiving and continuously advancing container bodies along a predetermined path of travel, means rotatable with and mounted at one end of one of said turrets for necking-in a container body wall inwardly of an end thereof, means rotatable with and mounted at the opposite end of said one of said turrets for shifting a container endwise into and out of said necking-in means on the turret, corresponding necking-in and shifting means rotatable with and respectively mounted on opposite ends of another of said turrets and in reverse position thereon relative to the respective necking-in and shifting means on said first mentioned turret for thereafter performing said shifting and necking-in operations in respect to the container body wall and inwardly of the opposite end thereof, and means for transferring said containers from the first to the second mentioned turret without interrupting the continuous advancement of the containers.

2. In a machine for necking-in the body walls of tubular fibre containers, the combination of a pair of rotatable turrets disposed in vertically spaced relation, each turret having peripheral pockets therein for receiving and continuously advancing the container bodies along a predetermined path of travel, die mechanism rotatable with and mounted at one end of the upper turret for engaging and necking-in a container body wall inwardly of an end thereof, a pusher member rotatable with and mounted at the opposite end of said upper turret for shifting a container endwise into and out of operative relation to said die mechanism on the turret, corresponding necking-in die mechanism and a pusher member rotatable with and respectively mounted on opposite ends of the lower turret and in reverse position thereon relative to the respective necking-in die mechanism and pusher member on said upper turret for thereafter performing said shifting and necking-in operations in respect to the container body wall and inwardly of the opposite end thereof, an intermediately disposed turret for receiving and transferring said containers from the upper turret to the lower turret without interrupting the continuous advancement of the containers, and independent cam mechanisms for respectively controlling the successive operations of said pusher members and necking-in die mechanisms on both of said turrets in time with the advancement of the containers by the turrets while the containers are carried in the said peripheral pockets of the latter.

JOHN F. PETERS.